Patented June 23, 1936

2,044,773

UNITED STATES PATENT OFFICE 2,044,773

PRESERVATIVE AND MARINE GROWTH ARRESTING PROCESS

Wallace T. Conn, Lawrence, Mass., assignor to Government of the United States, represented by the Secretary of Commerce No Drawing. Application April 5, 1934,
Serial No. 719,180

3 Claims. (Cl. 91—68)

(Granted under the act of March 3, 1883, as amended April 30, 1928; 370 O. G. 757)

The invention described herein may be manufactured and used by or for the Government of the United States for governmental purposes only, without the payment of any royalty thereon.

This is a continuation in part of my application Serial No. 640,352, filed October 29, 1932, for preservative and marine growth arresting process, and relates to a process for the preservation of articles made of cellulose or fibrous materials and also for arresting marine growth by the use of an organic compound of mercury.

It is well known that fish nets and marine cordage when exposed in natural bodies of water for a considerable period of time are subjected to deterioration which results in a loss of tensile strength. It is obvious that any accumulations of vegetable growth or of barnacle-like forms of shell fish which tend to close the meshes of the fish net offer increased resistance of the flow of water through the net. The stresses due to this increased resistance may be sufficient to result in the tearing loose of the net from its anchorage.

Marine growths which are attached to nets which are suspended from stakes or buoys also produce extra stresses due to the gravity and result in extraordinary strain and labor when a net has been handled. Small barnacles and other shell fish having sharp edges, when attached to nets result in the injury to the hands of fishermen. In certain fishing waters fixed heavy nets have to be brought ashore at frequent intervals for cleaning; this results in considerable cost and inconvenience. It is obvious that any method or chemical process that materially reduces marine growth and at the same time does not produce undesirable effects, is of commercial value.

I am aware that considerable study of the deterioration of marine articles has previously been made as is indicated by Harden F. Taylor in "Department of Commerce, Bureau of Fisheries Document No. 898". My invention is an improved method of treating vegetable fibers which are to be subjected to climatic and atmospheric changes, and has distinct advantages over that disclosed in prior publications and further is such a process as can be utilized for treating such fibers on a large commercial scale.

I am also aware, as taught by British Patent Number 305,943 of 1930, that it has heretofore been known to treat wood by the application of a medium comprising, as an active ingredient, a mercurized aliphatic hydrocarbon and to treat wood with a medium comprising, as an active compound, ethyl mercuric bromide dissolved in an organic solvent such as tar. However, it has not heretofore been known to treat marine cordage and the like with the compounds and by the method herein described and claimed.

My invention provides a preservative chemical treatment for fibrous material, including fish nets, marine cordage and the like, as well as providing an anti-fouling coating for the surfaces normally immersed in natural bodies of water for considerable periods of time. It has been shown by actual tests to increase the resistance to the destructive growths and forces to which such nets are subjected when in use as well as materially reducing the accumulations of marine growths on nets as well as upon surfaces upon which the accumulations of marine growths are objectionable.

It has been found that inorganic compounds of mercury, for example mercuric oxide, produce results of limited and uncertain values for net preservatives.

I have discovered that when an organic compound of mercury containing an ethyl radical, such as ethyl mercury oleate, ethyl mercury phosphate, and the like is mixed with or dissolved in a suitable carrier, such as a tar-like substance, and applied to cordage or webbing, that the amount of depreciation of the tensile strength of the fish nets immersed in natural bodies of water is materially decreased; that the rate of this depreciation is reduced; and that the accumulations of marine growths upon the nets are greatly reduced; thus the useful life of such nets is materially increased by lessening the maximum stresses to which they may be subjected as well as prolonging the period during which the net retains sufficient strength to be serviceable.

In fish net twine, to which this invention has been applied, it was found that a proportion of ethyl mercury oleate or ethyl mercury phosphate equivalent in weight to 1/100% of the tar carrier was positively but not materially efficacious, but when the proportion of the mercury compound was raised to ½%, the effect in reducing marine growths was superior to anything hitherto known. Coincident with this anti-fouling property of the organic mercury compound, the tensile strength of the impregnated twine has a greater resistance to depreciation when exposed under adverse conditions, to a degree higher than has previously been found when natural cotton twine was impregnated with a mixture of tar and added chemical.

In the application of my preservation I have found that best results may be obtained by thoroughly mixing the organic compound with the tar, or similar carrier, and immersing the cellulose material in this mixture for a period of time sufficient in length to expel the air from the cellulose stock, which is approximately three minutes, at a temperature sufficiently high to bring a thorough impregnation. A temperature of more than 180° F. has been found to give best results. The material thus treated should preferably be allowed to dry at atmospheric temperatures before use.

Marine growths and depreciation of fish nets, cordage, and the like, are subject to considerable variations due to location, month, year, etc. Hence, the protective requirement varies accordingly and, therefore, I do not limit my invention to the percentage or proportion of organic compounds of mercury having a radical such as ethyl mercury oleate or ethyl mercury phosphate above described as efficacious, nor do I limit my invention to this particular chemical in combination, since the effects or benefits produced are due to mercury in organic combination disseminated through or mixed with a carrier, with the mixture applied to or impregnated into the cellulose fibers, My invention also provides a means for materially retarding the deterioration of canvas; tobacco cloth; cordage; twine; or the like, from the effects of the weather and particularly from the effects of repeated wetting and long exposures in the air while damp.

The foregoing description comprehends only a general and preferred embodiment of my invention and detailed changes in the process, method, and compositions may be made within the scope of my claims which are, therefore, intended as not restricted to the specific details of my invention as disclosed herein.

What I claim is:

1. Cordage and the like having combined therewith a flexible, adhesive, organic substance in combination with an organic compound of mercury having an ethyl radical.

2. Cordage and the like having combined therewith ethyl mercury oleate in combination with a tar-like carrier.

3. Cordage and the like having combined therewith ethyl mercury phosphate in combination with a tar-like carrier.

WALLACE T. CONN.